United States Patent [19]

Beer

[11] 4,205,229

[45] May 27, 1980

[54] COOLED ECHELLE GRATING SPECTROMETER

[76] Inventor: Robert A. Frosch, Administrator of the National Aeronautics and Space Administration, with respect to an invention of Reinhard Beer, Glendale, Calif.

[21] Appl. No.: 956,529

[22] Filed: Oct. 31, 1978

Related U.S. Application Data

[63] Continuation of Ser. No. 646,333, Jan. 2, 1976, abandoned.

[51] Int. Cl.$^2$ ............................................. G01J 1/00
[52] U.S. Cl. .................................... 250/352; 250/338; 250/353; 356/328
[58] Field of Search ...................... 356/328, 51, 305; 350/162 R; 250/338, 352, 353

[56] References Cited

U.S. PATENT DOCUMENTS 3,658,423  4/1972  Elliott .................................. 356/328

OTHER PUBLICATIONS

McNutt et al., "Cryogenic Infrared Grating Spectrometer", Applied Optics, vol. 14, No. 5, May 1975, pp. 1116-1119.
Butcher, "An Échelle Grating for the 74-inch Coudé", Pro. Astron. Soc. Anst. (Australia), vol. 2, No. 1, Jul. 1971, pp. 21-22.
Schroeder, "Design Considerations for Astronomical Echelle Spectrographs", Publ. Astron. Soc. Pacific, vol. 82, No. 490, Dec. 1970, pp. 1253-1275.
Schroeder et al., "An Echelle Spectrograph for Astronomical Use", Pub. Astron. Soc. Pacific, vol. 83, No. 494, Aug. 1971, pp. 438-446.

*Primary Examiner*—Alfred E. Smith
*Assistant Examiner*—Carolyn E. Fields
*Attorney, Agent, or Firm*—Monte F. Mott; John R. Manning; Paul F. McCaul

[57] ABSTRACT

A cooled echelle grating spectrometer for detecting wavelengths between one micron and fifteen microns. More specifically, a spectrometer is disclosed having a cross-dispersing grating for ordering infrared energy, and an echelle grating for further ordering of the infrared energy. Means are disclosed to direct infrared energy to the cross-dispersing grating and then to the echelle grating. Ordered radiation from the echelle grating is sensed by a detecting means. Means are also disclosed for cooling the cross-dispersing grating, the echelle grating and the detecting means so that background radiation can be minimized. In a specific embodiment the cross-dispersing grating and echelle grating are in separate enclosed volumes having access to each other through a single intermediate aperture, reflected energy from the cross-dispersing grating being focused so as to pass through the intermediate aperture and then collimated and directed to the echelle grating for further ordering. Also disclosed is use of a Schmidt camera for focusing the further ordered radiation from the echelle grating onto a detector array having individual detectors dispersed on a plane which substantially corresponds to a curved focal plane of the Schmidt camera. A spectrometer constructed according to the teachings of the present invention will continuously cover the spectrum between one micron and fifteen microns and have a resolution of 0.1 cm.$^{-1}$.

7 Claims, 2 Drawing Figures

4,205,229

COOLED ECHELLE GRATING SPECTROMETER

This is a continuation of application Ser. No. 646,333 filed Jan. 2, 1976, now abandoned.

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

FIELD OF THE INVENTION

This invention relates to spectrometers, and more particularly to infrared echelle grating spectrometers. cl

BACKGROUND OF THE INVENTION

Echelle spectrometers have been utilized in spectroscopy for many years. However, conventional echelle spectrometers operate in the visible and ultraviolet wavelength ranges and are not commonly used for infrared wavelengths. A typical echelle spectrometer is described in U.S. Pat. No. 3,658,423 to W. G. Elliot and utilizes an echelle grating in conjunction with a prism for achieving resolution and order spacing. However, this conventional type of echelle spectrometer is used to examine wavelengths in the ultraviolet and visible regions. There is a need for a spectrometer having the resolution achievable with an echelle grating that can continuously cover the infrared wavelength region between one and fifteen micrometers or microns. The present invention discloses such a spectrometer.

SUMMARY OF THE INVENTION

The present invention provides an echelle grating infrared spectrometer having an entrance aperture, a dispersing grating, an echelle grating, an infrared detecting means and a means for cooling the dispersing grating, echelle grating and infrared detecting means. Infrared radiation entering through the entrance aperture is ordered by the dispersing grating and then further ordered by the echelle grating, thereby providing a wavelength range and resolution heretofor unobtainable with conventional echelle spectrometers.

In an embodiment, the dispersing grating is cross-oriented with respect to the echelle grating, and is referred to as a cross-dispersing grating. The spectrometer is constructed so that the cross-dispersing grating and associated collimation and focusing lenses are located in a first volume and the echelle grating, detecting means and associated collimating and focusing surfaces are located within the second volume. An intermediate aperture is located between the first and second volumes, the aperture size being selectable depending upon resolution and field of view requirements. Radiation ordered by the cross-dispersing grating is focused on a plane defined by the intermediate aperture, the aperture providing the only means by which infrared radiation can pass from the first volume to the second volume. Utilization of the aperture provides maximum discrimination against stray and background radiation which would otherwise be incident upon and ordered by the echelle grating if such isolation were not provided.

One application for a spectrometer according to the present invention would be in a space telescope designed to examine the near and intermediate infrared regions between one and fifteen microns, these regions being particularly difficult to examine from earth-based observatories due to atmospheric absorption. In such an application, spectrometer elements can be cooled by solid ammonia/methane cryogenic coolers, such coolers being well known in the cryogenic cooling art. However other types of cryogenic coolers could be utilized, it being only important that all elements of the optical system be cooled in order to reduce the effects of background radiation and increase the sensitivity of infrared detectors.

In a space telescope application, infrared radiation from a selected celestial body enters the spectrometer through an entrance aperture which is selectable according to the desired field of view. This radiation is then passed through an infrared filter which is selectable according to the wavelengths of interest within the overall infrared spectrum. The filtered infrared radiation is then collimated and reflected to the cross-dispersing grating where it is ordered. From the cross-dispersing grating, an order of interest is focused at a focal plane substantially defined by the intermediate aperture between the first and second volumes as previously explained. Radiation passing through the intermediate aperture is again collimated and reflected to an echelle grating where it is further ordered, the output of an order of the echelle grating being reflected to a detecting means by a bending flat (for convenience in cooling and alignment). By appropriately positioning the cross-dispersing grating, up to 80 echelle orders can be examined by the detecting means without any position changes required of the echelle grating itself.

In order to cover the infrared spectrum between one and fifteen microns, two types of infrared detectors are utilized, one being an Indium Antimonide (InSb) detector array for the one to five micron region, and one being a Mercury Cadmium Telluride (HgCdTe) array to cover the five to fifteen micron region. The specific array being utilized is selected by an angular position of the bending flat. In a specific embodiment of the invention, the detector arrays each comprise 1024 charged coupled detectors, each detector being fifty microns square and each being placed fifty microns from the other. Although charged coupled detectors were chosen for this embodiment, they are not essential to practice the teachings of the invention. Such a system can have a resolution of $0.1$ cm$^{-1}$, this resolution being obtainable over the entire infrared frequency range abovementioned. A spectrometer having a range between 1 and 15 microns wavelength and a resolution of $0.1$ cm$^{-1}$, which can be packaged within a single relatively compact volume, can be constructed according to the teachings of the present invention.

DETAILED DESCRIPTION

As required, a detailed illustrative embodiment of the invention is disclosed herein. This embodiment exemplifies the invention and it is currently considered to be the best embodiment for such purposes. However, it is to be recognized that other collimating, reflecting and focusing means could be utilized in routing and isolating infrared radiation of interest within the spectrometer. Accordingly, the specific embodiment disclosed is representative in providing a basis for the claims which define the scope of the present invention.

As previously explained, the invention provides an echelle grating infrared spectrometer which comprises an entrance aperture, a dispersing grating, an echelle grating, an infrared detection means and a means for cooling the dispersing grating, echelle grating, and a detection means so that infrared radiation entering through the entrance aperture and ordered by the dispersing grating and further ordered by the echelle grating can be detected by the detection means. The invention also teaches variously located apertures, filters, collimators and focusing means within the spectrometer in order to properly effect the focusing of a substantial number of echelle orders on the detection means. According to the teachings of the invention, an infrared spectrometer is provided to continuously cover an infrared spectrum having wavelengths between one micron and fifteen microns. Such a spectrometer would have special application for use as a space-based telescope to examine the infrared spectrum of various celestial objects.

Figure 1:
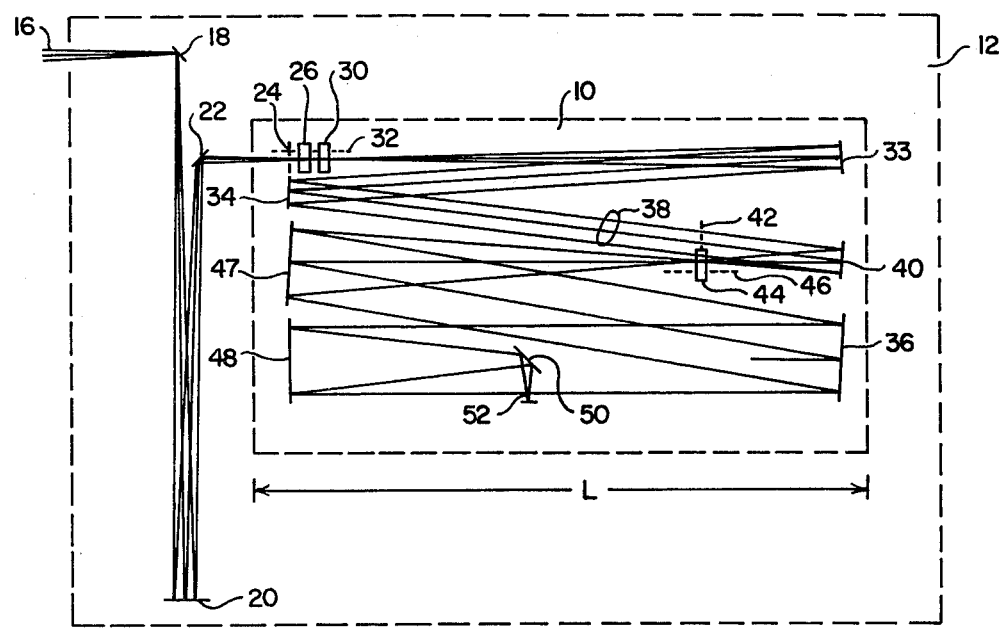
FIG. 1 is a diagrammatic illustration of reflective surfaces and light rays within the spectrometer.

The basic optical elements making up the spectrometer will be explained first, and then an application of the principles taught by the invention to a space telescope will be illustrated. Referring to FIG. 1, the optical elements of a cooled echelle grating spectrometer 10 are shown. The spectrometer 10 is contained within an outer housing 12 to provide insulation between an external ambient environment and cooled optical elements comprising the spectrometer 10. Infrared radiation 16, which comprises wavelengths within the 1 to 15 micron range, enters the outer housing 12 and is reflected from first, second and third reflecting surfaces 18, 20, and 22 respectively, and focused at an entrance window/field lens 24. Potassium bromide (KBr) was chosen as an entrance window 24 material because of its low refractive index and dispersion, wide transmission range and relative freedom from adverse effects due to charged-particle radiation. Adjacent to the entrance window 24 is a rotatably-mounted entrance aperture selection wheel 26. In addition to the aperture selection wheel 26, a rotatably-mounted filter wheel 30, containing a plurality of selectable spectrum-defining filters within the one to fifteen micron range, is provided in order to limit the infrared radiation entering the spectrometer 10. Both the aperture selection wheel 26 and filter wheel 30 are mounted on an axis 32 offset from the infrared radiation beam 16. This offset allows different filters and different apertures to be selected merely by rotation of the respective wheels 26 and 30.

A first collimator 33 is positioned to collimate the entering infrared radiation 16, and to reflect the collimated radiation to a cross-dispersing grating 34, cross-dispersing referring to the orientation of the grating with respect to an echelle grating 36. Although in this particular embodiment, a cross-dispersing grating 34 is utilized, a grating that is oriented parallel to the echelle grating 36 could be utilized. Ordered infrared radiation 38 is reflected from the cross-dispersing grating 34, the grating 34 being oriented so that a predetermined order will comprise the infrared radiation 38 which will intersect a first focusing surface 40, the surface 40 having a focal plane shown at 42. An intermediate aperture wheel 44 having a plurality of selectable apertures is disposed so that it can be rotated about an axis 46 so that various-sized apertures can be positioned at the focal plane 42 of the first focusing surface 40. These intermediate apertures serve as entrance apertures to an echelle system to be described below.

Infrared radiation ordered by the cross-dispersing grating 34 and focused by the first focusing surface 40, after passing through an appropriate intermediate aperture chosen from the intermediate aperture wheel 44, is directed to a second collimating surface 47 and reflected therefrom to the echelle grating 36. The echelle grating 36 further orders the infrared radiation reflected from the second collimating surface 47. The further-ordered radiation reflected from the echelle grating 36 is focused by an appropriately positioned Schmidt camera focusing mirror 48, infrared radiation reflected therefrom being further reflected by a bending flat 50 and focused on a detector array 52. A Schmidt camera mirror is well known in the optical art, and was chosen for its freedom from coma and astigmatism. However it is characterized by a strong spherical aberration and a spherical focal plane concentric with the camera, and having half the radius of the curvature of the camera. In a spectrometer having a dimension of one meter as shown at L, a Schmidt camera having a one meter radius of curvature could be chosen.

In order to cover the spectral region between 1 and 15 microns, two different types of detectors are required, a single detector material exhibiting an adequate detectivity across a 15 micron wavelength range not having been found. Although many different types of detector materials to cover this range could be utilized, one possibility would comprise an Indium Antimonide (InSb) charged coupled detector (CCD) array for the 1 to 5 micron range, and a Mercury Cadmium Telluride (HgCdTe) CCD array for the 5 to 15 micron range. Optimum performance of these arrays is obtained when they are cooled to below 70° Kelvin. The temperature of the spectrometer 10 optical elements and case should be below 160° Kelvin in order to reduce background radiation.

Many types of cryogenic cooling systems could be utilized for cooling the spectrometer 10. For space applications, solid ammonia ($NH_3$) at 152° Kelvin is chosen for cooling the optical elements and case of the spectrometer 10, and solid methane ($CH_4$) at 63.5° Kelvin for cooling the detectors. Although many detector configurations could be selected for use in conjunction with the Schmidt camera focal plane, one such configuration would be a $1024 \times 1$ HgCdTe array and a $512 \times 2$ InSb array. Using these two detector arrays, the bending flat 50 can be positioned so that infrared radiation reflected from the Schmidt camera 48 can be directed to the appropriate array depending on the specific wavelength of interest. Charge coupled detectors (CCD's) would be particularly appropriate in this type of application because of their low heat generation. The two detector arrays can be divided into appropriately sized subarrays and mounted so that they substantially correspond to the focal plane of the Schmidt camera, the focal plane being curved as previously explained. In a particular embodiment of the invention, individual detectors comprising a detector array have a dimension of fifty microns square, each detector being spaced apart from an adjacent detector by fifty microns. During the gathering of spectrum information for any given spectral interval, a positioning means for the detector arrays can be adapted to offset each array by 50 microns in accordance with an external command. Thus each detector can provide spectral information over a 100 micron interval of the Schmidt camera focal plane. This particular configuration can be utilized whenever the cost of the detector elements is such that a continuous detector array covering a spectral interval of interest is not economically feasible.

The optical elements shown in FIG. 1 when cooled and configured as above-described can be used to examine approximately 80 echelle grating diffraction orders by appropriately positioning only the cross-dispersing grating 34. Thus, according to the teachings of the invention, an echelle grating spectrometer is used to cover a fifteen to one wavelength range, a range unachievable by conventional visible/ultraviolet spectrometers utilizing echelle gratings. Use of the cross-dispersing grating 34 also eliminates stray infrared radiation which might otherwise by apparent in the final spectrum output.

Figure 2:
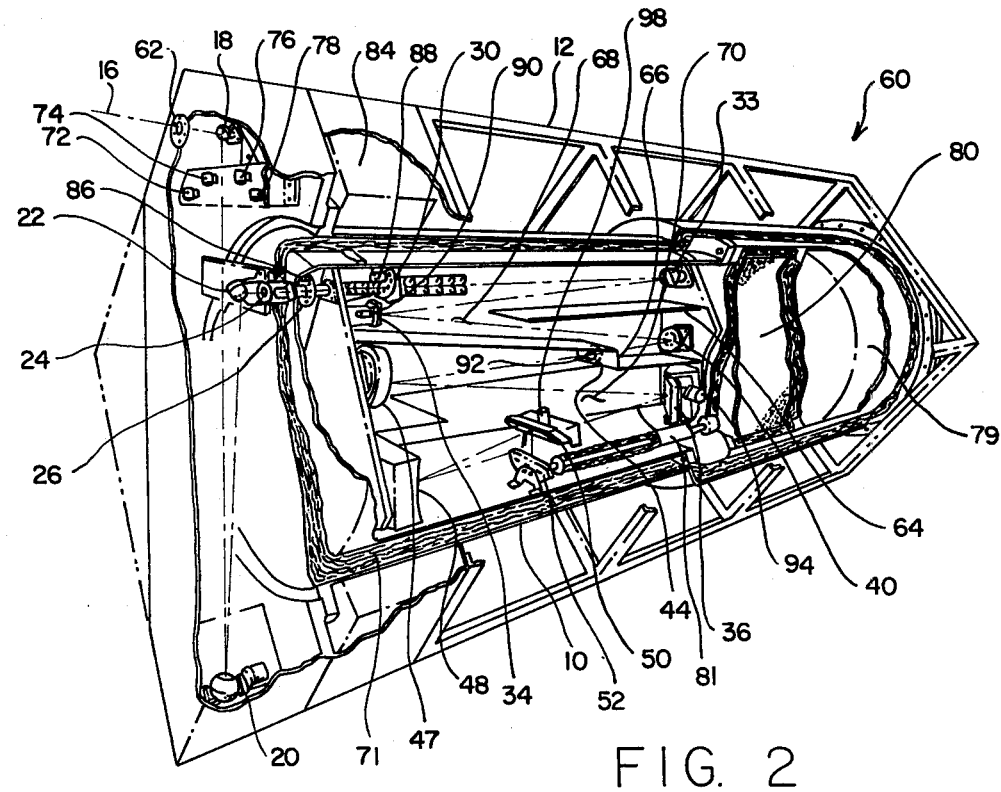
FIG. 2 is a perspective, partially cut away view of a spectrometer according to the present invention.

A space telescope 60 utilizing a spectrometer 10 according to the present invention is shown in FIG. 2. Infrared radiation 16 from a celestial body enters the space telescope 60 through a telescope entrance aperture 62 and is focused by the first, second and third reflecting surface 18, 20, and 22, to enter the spectrometer 10 through the entrance window 24 and an appropriate aperture selected from the entrance aperture selection wheel 26. The infrared radiation then is filtered in accordance with the spectral region of interest by an appropriate filter contained within the filter wheel 30 and is then collimated by the first collimator 33. A first baffle 64 is provided for stray radiation shielding purposes. Collimated radiation from the first collimator 33 is ordered by the cross-dispersing grating 34, and, by appropriate orientation of the grating 34, an order of interest is directed to the first focusing surface 40. Radiation focused by the first focusing surface 40 passes through an appropriate intermediate aperture selected from the aperture wheel 44 and is recollimated by the second collimating surface 47. A second baffle 66 is provided, the baffle 66 dividing the spectrometer 10 into a first volume 68 and a second volume 70. The purpose of the second baffle 66 is to further reduce the effects of stray infrared radiation. Radiation passing through the intermediate aperture is recollimated by the second collimating surface 47 and reflected therefrom to the echelle grating 36 which further orders the infrared radiation, the further ordered radiation then being focused by a Schmidt camera 48 on the bending flat 50 and downwardly to the detector array 52 as previously explained.

The infrared spectrometer 10 has a double outer wall filled with insulating material 71 to further preserve integrity of the cooling system. Other features of the space telescope include four infrared calibration sources 72, 74, 76, and 78, these sources being directed to the second reflecting surface 20. The purpose of these calibration sources 72, 74, 76 and 78 is to provide a means for testing the spectrometer 10 whenever desired. A cryogenic system for the space telescope comprises a first storage tank 79 which contains solid ammonia (NH$_3$) at 152° Kelvin and a second storage tank 80 which contains solid methane (CH$_3$) at 63.5° Kelvin. The solid methane is connected to the detector array 52 by a heat conducting rod 81, thereby maintaining the detector array 52 below 70° Kelvin as required for proper operation. Cooling from the first storage tank 79 is slowly released into the first and second volumes 68 and 70 of the space telescope 60, and vented to space from vents not shown. Although a methane/ammonia cooling system is utilized for this specific space telescope application, any of a variety of cryogenic systems well known in the art could be utilized instead.

Electronic processing of the outputs of each detector can be accomplished by a variety of systems. In one system, charged packets are clocked out of the detectors, digitized and summed into 1,024 parallel accumulators. This information is merged with appropriate configuration information such as start and stop times, aperture selection wheel 26 location, filter wheel 30 location, position of the cross-dispersing grating 34, and position of the intermediate aperture wheel 44. Processing is effected in an electronics unit 84.

For a detector configuration in which each detector is offset from an adjacent detector by one detector width, a continuous spectrum can be examined by displacing radiation being examined by one detector width. In the space telescope 60, this displacement is effected by rotation of the bending flat 50. Positioning mechanisms for the space telescope 60 comprise an aperture selection wheel positioner 86, a filter wheel positioner 88, a cross-dispersing grating positioner 90, an intermediate aperture positioner 92, an echelle grating positioner 94 and a bending flat positioner 98. In operation, appropriate positioning of the entrance aperture selection wheel 26, filter wheel 30, the intermediate aperture wheel 44 and the bending flat 50 allows the selection of any wavelength interval of interest between 1 micron and 15 microns, the ordering provided by the cross-dispersing grating 34 allowing 80 echelle orders to be examined by the detector array 52.

Thus as one can appreciate, the invention teaches an echelle grating infrared spectrometer which can be utilized in conjunction with a space telescope for examining the infrared spectrum between 1 micron and 15 microns. The spectrometer comprises an entrance aperture, a dispersing grating, an echelle grating, an infrared detection means, and a means for cooling all the spectrometer elements. An apparatus is described which through appropriate collimation and focusing within the spectrometer provides a resolution in the infrared spectrum which has been heretofore unobtainable by conventional echelle grating spectrometers, this resolution being possible through use of a cross-dispersing grating in conjunction with an echelle grating, the combination being cooled in order to reduce background radiation in the infrared range.

What is claimed is:

1. An echelle grating infrared spectrometer comprising:

an entrance aperture;

an echelle grating;

a dispersing grating which is cross-oriented with respect to said echelle grating;

infrared detection means;

means for angularly positioning said dispersing grating so that predetermined echelle orders are directed to said detection means;

a first collimating means for collimating infrared radiation from said entrance aperture, said collimated infrared radiation being directed to said dispersing grating;

an intermediate aperture;

a first focusing means for focusing ordered infrared radiation reflected from said dispersing grating on a plane defined by said intermediate aperture, a second collimating means for collimating infrared radiation passing through said intermediate aperture, said collimated infrared radiation being directed to said echelle grating;

a second focusing means for focusing further ordered infrared radiation reflected from said echelle grating on said detection means; and means for cooling said dispersing grating, echelle grating and said detection means so that infrared radiation entering through said entrance aperture, ordered by said dispersing grating, and further ordered by said echelle grating is detected by said detection means.

2. The spectrometer of claim 1 further comprising a plurality of selectable infrared filters, one of which is located between said entrance aperture and said first collimating means.

3. The spectrometer of claim 2 in which said second focusing means is a Schmidt camera.

4. The spectrometer of claim 3 in which:

said infrared detection means comprises an Indium Antimonide (InSb) detector array and a Mercury Cadmium Telluride (HgCdTe) detector array, said InSb array being used for detecting infrared radiation having wavelengths between 1 micron and 5 microns and said HgCdTe array being used for detecting infrared radiation having wavelengths between 5 microns and 15 microns; and said cooling means comprises means to cool said InSb and HgCdTe arrays below 70° K.

5. The spectrometer of claim 4 in which said InSb detector array and said HgCdTe detector array are disposed on a plane that substantially corresponds to said Schmidt camera focal plane.

6. The spectrometer of claim 1 further comprising:

a first enclosed volume containing said dispersing grating;

a second enclosed volume containing said echelle grating and said detection means;

said intermediate aperture disposed between said first and second volumes so that infrared radiation entering said first volume through said entrance aperture and reflected by said dispersion grating will pass into said second volume and to said echelle grating.

7. A method of infrared spectroscopy comprising the steps of:

directing infrared radiation from a source through an entrance aperture;

dispersing said directed radiation by a dispersing grating that is cross-oriented with respect to an echelle grating;

collimating said infrared radiation from said entrance aperture prior to said dispersing step;

focusing infrared radiation dispersed by said dispersing grating on a plane defined by an intermediate aperture;

collimating said focused radiation after having passed through said intermediate aperture;

further dispersing said collimated focused radiation by said echelle grating;

focusing said further dispersed infrared radiation on a detection means;

angularly positioning said dispersing grating so that a predetermined echelle order can be directed to said detection means;

detecting said further dispersed radiation; and cooling said dispersing grating, echelle grating and detection means.

* * * * *